UNITED STATES PATENT OFFICE.

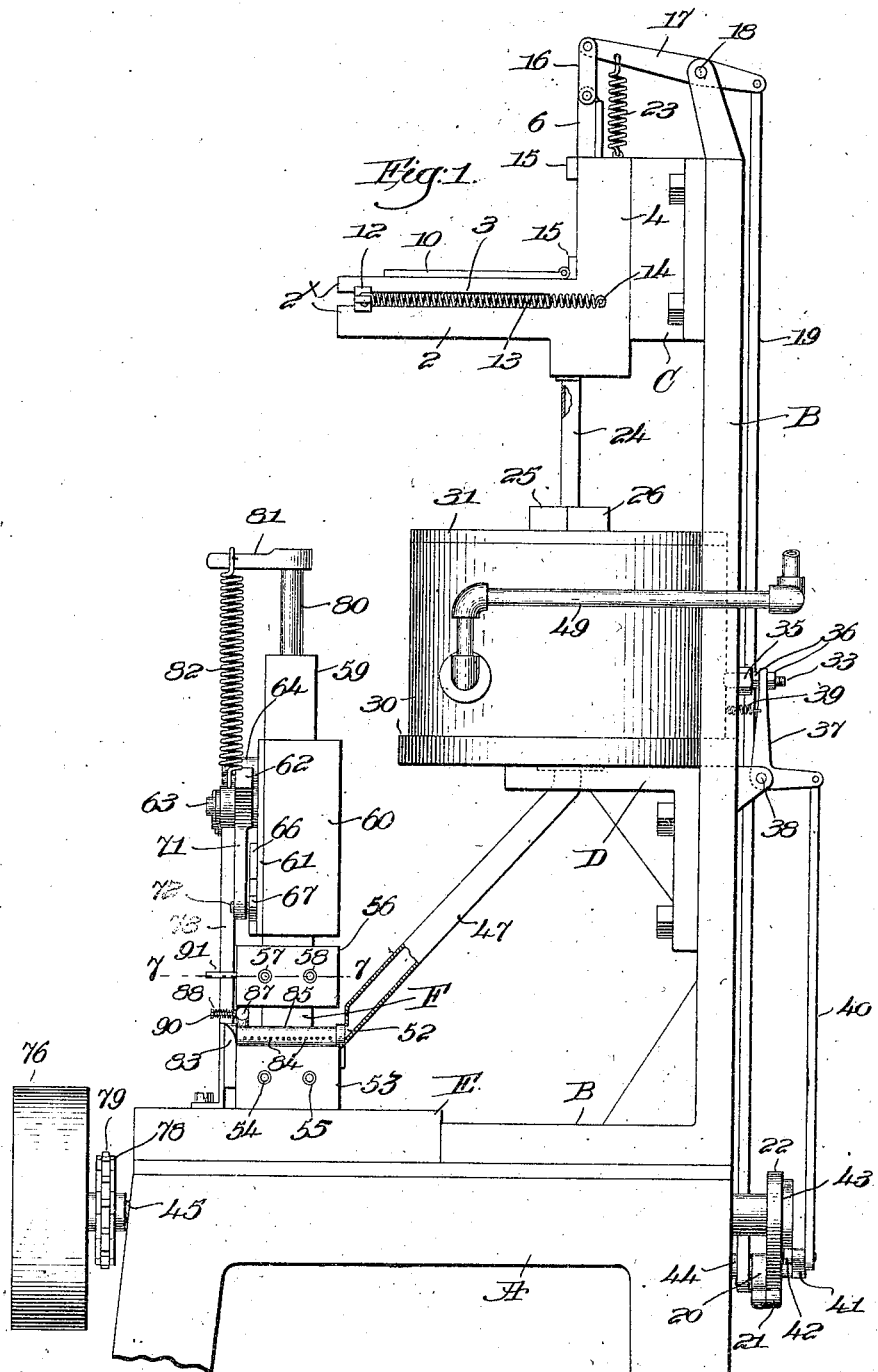

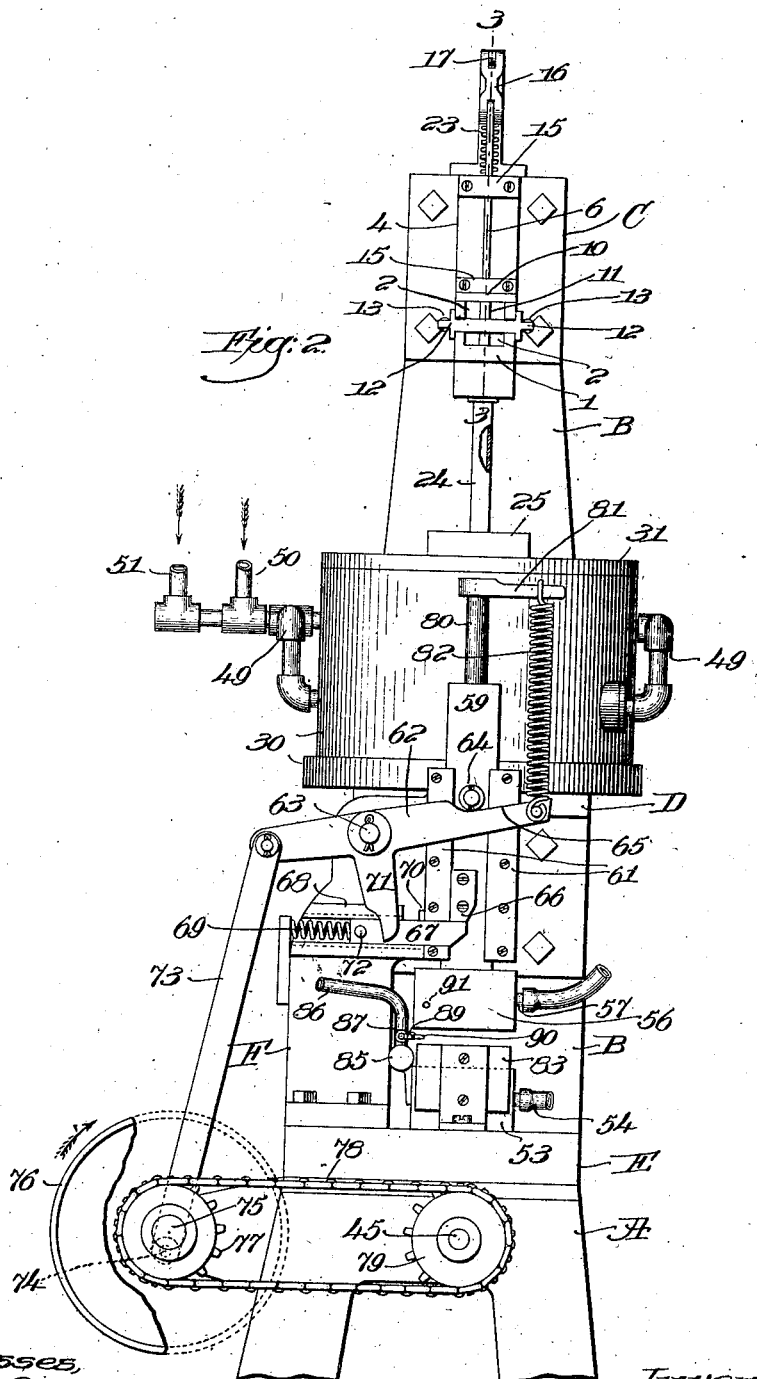

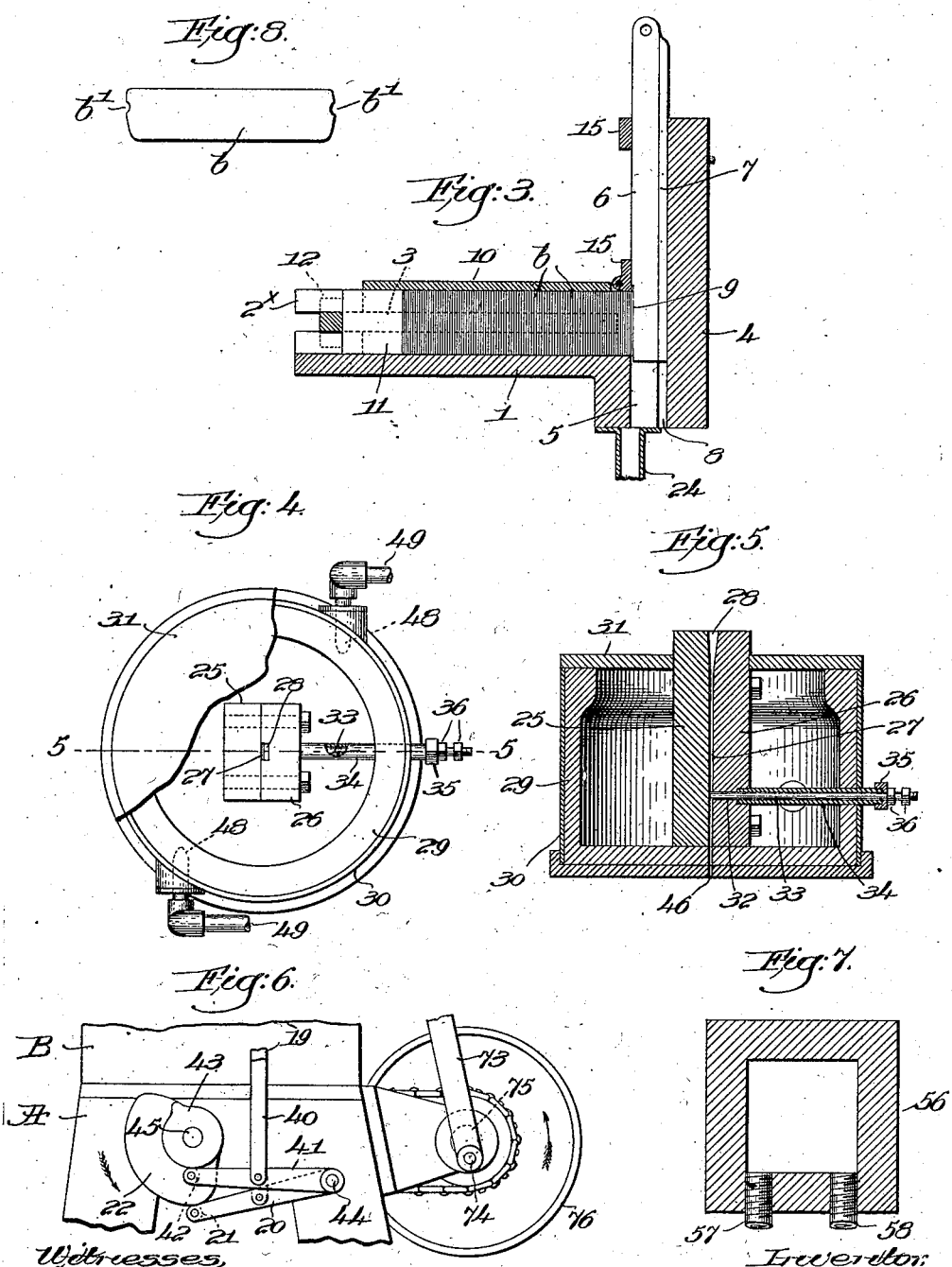

RICHARD T. WINN, OF CLIFTONDALE, MASSACHUSETTS, ASSIGNOR TO JAMES W. LESLIE, OF CHELSEA, MASSACHUSETTS.

APPARATUS FOR TEMPERING BLADES.

1,121,884.  Specification of Letters Patent.  Patented Dec. 22, 1914.

Application filed June 28, 1909. Serial No. 504,684.

*To all whom it may concern:*

Be it known that I, RICHARD T. WINN, a citizen of the United States, and resident of Cliftondale, county of Essex, State of Massachusetts, have invented an Improvement in Apparatus for Tempering Blades, of which the following description, in connection with the accompanying drawing, is a specification, like characters on the drawing representing like parts.

This invention relates to apparatus for tempering and hardening metal blades, and more particularly the present apparatus is designed for the treatment of the small metal blades used in so-called "safety razors". These blades are cut or stamped out from thin plate or sheet steel, which is relatively soft, to enable the blades to be made more readily, and thereafter the blades must be tempered in order to bring them to the requisite degree of hardness, such tempering being effected by heating the blades to the necessary temperature and suddenly cooling them. Heretofore considerable trouble has been experienced in tempering such blades because of the rapid formation of scale thereupon, and the warping or twisting of the blades when subjected to the action of the heat necessary to raise their temperature to the proper point for hardening. The scale deposited must be removed, and frequently the blades have been warped to such an extent as to require considerable manipulation to straighten them, both operations increasing the cost of manufacture. Furthermore, it has been found difficult to temper economically and commercially a large number of blades uniformly, the means for tempering now in vogue frequently resulting in wide variations in the hardness of a given lot of blades treated.

My present invention has for its object the production of tempering apparatus so constructed and arranged that each blade treated shall be tempered and hardened uniformly with respect to other blades, with the elimination of scale formation on the blades, and obviating any warping or twisting of the blades during the treatment.

I have so constructed the apparatus embodying my present invention that the blades are presented automatically to the heating chamber, and in the latter each blade is retained a predetermined period of time and then released and passed to the cooling means.

During the heating of a blade it is protected from the direct action of the flame and from the action of air, while at the same time it is subjected on both sides to uniform heat, thereby preventing the formation of scale and obviating warping or bending.

The operation of the apparatus is automatic throughout, the only manual operation required being that necessary to replenish from time to time the hopper or magazine from which the blades are fed automatically and one by one to the heater.

These and other novel features of my invention will be fully described in the subjoined specification and particularly pointed out in the following claims.

Figure 1 is a front elevation of a tempering apparatus embodying one practical form of my present invention, the movable member of the cooling means being elevated in readiness to act upon the next heated blade presented thereto; Fig. 2 is a left-hand side elevation of the apparatus illustrated in Fig. 1, and showing more clearly the cooling means and the mechanism for operating the movable member thereof; Fig. 3 is an enlarged vertical sectional detail, on the line 3—3, Fig. 2, of the magazine for the blades and the transferrer by which said blades are removed one by one from the magazine, the transferrer being shown in elevation and in its elevated position; Fig. 4 is a top plan view, with the top broken out, of the heating means for the blades; Fig. 5 is a vertical sectional detail of the heating means, on the line 5—5, Fig. 4; Fig. 6 is a side elevation of a portion of the operating mechanism which controls the transferrer and the escape of the heated blade from the heating means, to show more clearly the controlling cams, to be referred to; Fig. 7 is an enlarged transverse section, on the line 7—7, Fig. 1, of one of the members of the blade-cooling means; Fig. 8 is an enlarged plan view of one of the blanks or blades to be treated.

Referring to Figs. 1 and 2, a heavy base A has rigidly secured to it a strong upright standard B having an attached bracket C at its upper end for supporting the magazine, to be described, a second bracket D attached to the standard lower down serving to sustain the heating means. A heavy metal bed-plate E is secured to the base and forms the support for the fixed member or anvil of the blade-cooling means and also for other parts of such means, as will appear hereinafter.

The blade or blank $b$, Fig. 8, is stamped or otherwise formed from thin plate or sheet steel, and is substantially rectangular, having notches $b'$ in its opposite ends, though the particular structure of the blade is not important so far as my present invention is concerned.

In the present embodiment of my invention the magazine for the blades comprises a horizontal bottom 1 and upright, parallel side walls 2, longitudinally slotted at 3, and said bottom and walls are conveniently made as a casting projecting laterally from an upright back 4 suitably attached to the bracket C. Said back is provided with an upright guideway 5, Fig. 3, for the reception of a vertically movable transferrer 6, having lateral ribs 7 to enter grooves, as 8, Fig. 3, in the guideway, the outer face of the transferrer being recessed at 9 to form a seat for the reception of a blade.

The blades $b$ are placed in the magazine on end, and face to face, as shown in Fig. 3, the internal dimensions of the magazine being such as to readily accommodate a series of the blades, the leading blade entering the seat 9, as shown, when the transferrer is raised.

A hinged lid 10 closes the top of the magazine when the apparatus is in use, and the outer end of said magazine is closed by a sliding rectangular block 11 constituting a follower, said follower having transverse ears 12 notched to enter the slots 3 of the side walls. Strong spiral springs 13 are attached at their outer ends to the ears and at their inner ends are fixed at 14 to the sides of the upright back 4, the springs acting to press the follower against the last blade of the series in the magazine and to feed the series forward each time the transferrer 6 rises, in order to push the leading blade into the seat 9. Cross-bars 15 on the back 4 assist in retaining the transferrer in its guideway, the latter being filled by the transferrer, so that the admission of air to other parts of the apparatus is practically prevented. When the transferrer is moved downward from its position shown in Fig. 3 it carries with it the single blade in the seat 9, and part of the transferrer above such seat then serves as a stop for the next blade of the series in the magazine, pressed against the transferrer by the springs 13. The magazine walls are reduced in thickness at their outer ends, at $2^x$, to form extensions into which the slots 3 are continued, guiding the ears 12 when the follower is drawn out to its limit. A short link 16 pivotally connects the upper end of the transferrer with one end of a rocking lever 17 fulcrumed at 18 on the standard B, the opposite end of said lever having pivoted to it a depending lifting rod 19, attached at its lower end to a rocking arm 20, Figs. 1 and 6, having a roll 21 adapted to bear against the edge of a controlling cam 22, the transferrer being depressed at the proper time by a strong spring 23, Fig. 1.

At each revolution of the transferrer cam 22 the transferrer is first elevated into position to receive in its seat 9 a blade from the series of blades in the magazine, and then the cam permits the spring 23 to depress said transferrer and carry the seated blade down below the bottom of the magazine and discharge it into the lower, throat-like end of the guideway 5, the discharged blade passing thence into a closed conduit or raceway 24. Said raceway at its lower end is directly connected with the upper end of the heater, which is a very important feature of my invention, and it is conveniently made by bolting together two heavy, elongated and preferably cast-iron blocks 25, 26 the block 26 having a longitudinal and shallow, narrow channel 27 formed in its inner face and preferably flared at 28, Figs. 4 and 5, at its inlet end.

When the two blocks are bolted together a narrow passage is thus formed extending from end to end, the heater being massive in its dimensions relative to the size of the object to be heated, to wit, the blade, its great mass of metal providing for the retention of a high degree of temperature with great uniformity and unaffected by the entrance thereinto of successive blades from the magazine.

The passage 27 is just large enough to admit a blade to traverse it end foremost; so that when the blade is at its temporary stopping point in the passage it will be practically surrounded by highly heated metal yet completely excluded from the action of air, and as the temperature is uniform at all portions of the blade there is no tendency thereof to warp, twist or become distorted in any way.

The heater is set up on end in a drum-like heating chamber 29, preferably made of fire-brick or other refractory material, inclosed in a casing 30 of metal, the bottom of the casing resting on the bracket D, a cover or top 31 of asbestos or other suitable material closing the chamber, and as shown herein the upper end of the heater projects somewhat through the cover, and is laterally supported thereby.

One of the heater-members, as 26, has a lateral hole 32 bored through it to intersect the passage 27 somewhat below the center thereof, to receive a longitudinally movable blade-arrester 33, which is fitted to slide in a metallic tube or jacket 34, Figs. 4 and 5, screwed into the member 26 and passed through a suitable hole in the side wall of the heating chamber, and then through the standard B, the latter being shaped to fit part way around the heating chamber.

An apertured cap 35 closes the outer end of the tube and fits snugly around the blade-arrester, which latter has mounted on it separated nuts or collars 36 to receive between them the forked end of a bell-crank 37 fulcrumed at 38 on the said standard, a spring 39, Fig. 1, acting upon the bell-crank to operatively position the inner end of the blade-arrester across the passage 27, as shown in Fig. 5.

The bell-crank is connected by a link 40 with a rocking arm 41, Figs. 1 and 6, having a roll 42 to coöperate with a tappet-cam 43, the arms 41 and 20 being fulcrumed at 44 on the base A of the apparatus and the tappet-cam 43 and transferrer-cam 22 being fixedly mounted on a shaft 45 rotatably mounted in suitable bearings on said base.

At each revolution of the tappet-cam the blade-arrester is withdrawn from the blade passage 27 in the heater and then returned to operative position, the withdrawal permitting a blade supported by said blade-arrester to drop down to the lower end of the passage and out through an opening 46, Fig. 5, in the bottom of the heating chamber, into the upper end of a closed or tube-like raceway 47, to be referred to hereinafter.

The heating chamber 29 is maintained at a high temperature by any suitable means, and herein I have shown said chamber as equipped with Bunsen or similar burners 48, the nozzles of which enter the chamber through openings in its side walls, said burners being arranged substantially diametrically opposite each other and in parallelism, so that the flame or gases in combustion within the chamber has a rotary or reverberatory motion about the central heater 25, 26. As said heater is thereby encompassed by flames or gases in combustion it is heated to a high temperature, but manifestly the products of combustion cannot enter the blade passage 27 nor can they at any time come in contact with a blade in such passage. This, with the practical shutting off of air from said passage, prevents the formation of scale on the blades, and the latter cannot become burned or otherwise damaged by contact with the products of combustion in the chamber 29, a very important feature of the invention.

When a blade passes from the transferrer to the heater it is arrested by the blade-arrester 32 and is supported thereby in the hottest part of the heater for a sufficient length of time to be itself raised to the requisite hardening temperature, say about ten seconds, and this heated blade is then released automatically and passes through the raceway 47 to the cooling means.

The burners are connected with outside pipes 49, each in communication with other pipes 50, 51, Fig. 2, leading from supplies of combustible gas and air under pressure, to form a highly inflammable mixture, and so far as my invention is concerned it is not restricted to any particular form or character of means for raising the temperature in the heating chamber 29. Provided the heater having the inclosed blade-passage is heated to the proper temperature from its exterior such rise in temperature can be effected by any desired and suitable means, though I have illustrated one very efficient and satisfactory means for that purpose.

After the hot blade enters the closed raceway 47, which is inclined from the bottom of the heating chamber to the fixed member or anvil of the cooling means, the blade is protected from the outside air until it slides through the narrow outlet or mouth 52 of said raceway, Fig. 1, and drops onto the flat top of the anvil, shown herein as a hollow casting 53 fixed on the bed E and cooled by water circulated therethrough by means of suitable pipes 54, 55.

The anvil is made large and heavy relatively to the size of the blade, and it is strong enough to resist the impact of the blow delivered by the movable member or hammer 56 of the cooling means, made as a hollow block-like casting and kept cool by water circulation by means of flexible pipes attached to nipples 57, 58 leading into the interior of the hammer, Fig. 7.

The hammer is attached to or forms part of an upright rectangular stem 59 fitted to slide in a vertical guide 60 forming part of a heavy stand F bolted securely on the bed E, face-plates 61 retaining the stem in the guide. A hammer-lifting lever 62 is fulcrumed at 63 on the stand to rock in a plane parallel to and in front of the path of movement of the hammer stem, the latter being provided with a suitable roll 64 which overhangs and is adapted to be engaged and lifted by the part 65 of the lever 62, see Fig. 2.

The stem has secured to it a stop 66 adapted to engage and rest upon a latch 67 mounted to slide horizontally in a guide 68 mounted on the stand F, as shown in Fig. 2, said latch being moved into operative position, illustrated, by a spring 69, and arrested by a detent 70 engaging the edge of the adjacent face-plate 61.

The lifting lever 62 is provided with a depending arm 71 constituting a releasing device for said latch, the arm being arranged to engage pin 72 projecting from the latch, to retract the latter from beneath the stop 66 when the lever is rocked to disengage the part 65 from the roll 64. A link 73 is pivotally connected with the rear end of the lifting lever, and at its lower end said link is connected with a wrist-pin 74 on the main driving shaft 75 of the apparatus, to oscillate said lever, the shaft being provided with a pulley 76 to receive a suitable driving belt actuated from any suitable source of power (not shown). Said shaft 75 has also an attached sprocket 77, Fig. 2, connected by a sprocket-chain 78 with a sprocket 79 fast on the cam-shaft 45, to drive the latter.

The hammer-stem 59 has a prolongation 80 provided with an offset head 81 to which is attached the upper end of a powerful hammer-depressing spring 82, the lower end of which is attached to the longer arm of the lifting lever 62. When said lever is rocked to depress its longer arm the spring 82 is thereby put under tension, and as the lever continues to rock the trip 71 engages the pin 72 and withdraws the latch 67 from beneath the stop 66, thereby releasing the hammer-stem, and the spring 82 contracts and moves the hammer 56 down to deliver a sharp, heavy blow upon the anvil 53 and upon a blade thereupon. After the hammer-blow has been delivered the rotation of shaft 75 causes the link 73 to rock the lever 62 in the opposite direction and the part 65 is brought into engagement with the roll 64 and the hammer is thereby lifted, the trip 71 moving away from the latch-pin 72, so that as soon as the stop 66 rises to the position shown in Fig. 2 the spring 69 expands and projects the latch 67 into locking position beneath the stop, locking the hammer in elevated position until again released.

It will be understood that the blade being heated in the heater will be released by withdrawal of the stop 33 just before the lifted hammer is released, the hot blade sliding down the raceway 47 and shooting from the mouth 52 thereof onto the anvil 53 an instant before the hammer descends and acts with a spanking blow upon the blade. This quick, sharp impact of the cold hammer upon the hot blade, acts in connection with the cold anvil, to suddenly cool the blade, which is thereby tempered to the requisite degree of hardness. As the blade is compressed between the two cold members 53, 56 it is equally cooled on opposite sides, the timing of the blow being such that it acts practically simultaneously with the positioning of the hot blade on the anvil, so that there is no opportunity for the blade to cool unequally or to warp, and its exposure to the air before the blow is of such exceedingly short duration that no objectionable action can occur.

When one blade is released from the heater another blade is disengaged from the magazine by the transferrer and descends into the heater just after the stop 33 returns to operative position, so that while there are blades in the magazine the operation of the apparatus is automatic, each blade being subjected to the same degree of heat, for the same length of time, and every blade receives a blow from the hammer equal in strength to the blow delivered upon every other blade. Thus the heating is uniform, and the cooling is also uniform, for each and every blade, and thereby all the blades will be tempered exactly alike.

When the hot blade shoots onto the anvil 53 its momentum tends to carry it across the anvil, and in order to prevent displacement and to properly position the blade I provide a blade-stop 83, located at the side of the anvil opposite the mouth of the raceway 47 and projecting above the top of the anvil, and preferably this blade-stop is made of wood. I prefer wood, as I find by experience that the elasticity of the wood acts upon the light blade with just about the right force to throw the blade back, by its rebound, to substantially the center of the anvil, in the best position to receive the blow of the hammer.

Any suitable means may be employed to remove or clear the cooled blade from the anvil, and herein I have provided for such removal by means of intermittent blasts of air delivered through the apertures 84, Fig. 1, of a horizontal chamber 85 located at the back of the anvil and connected by a pipe 86 with a suitable source of compressed air (not shown). The admission of the air to the chamber 85 is controlled by a suitable valve at 87, its stem being acted upon by a spring 88, Fig. 1, to normally close the valve, the stem having an attached finger 89 terminating in a pivoted spring tip 90 lying in the path of a pin 91 on the hammer.

When the hammer descends the pin 91 wipes over and passes under the tip 90, the latter yielding on the down-stroke, and when the hammer rises the pin acts upon the tip to swing the finger 89 upward, opening the valve to cause an air blast to blow across the face of the anvil and clear the cooled blade therefrom. As the hammer continues to rise the pin 91 is drawn up out of engagement with the tip 90 and the spring 88 immediately returns the finger to normal position, closing the valve and stopping the air blast.

Such a form of trip valve is not novel, so far as I am aware, and is not claimed *per se*, and any other suitable means for delivering intermittent air blasts to clear the cooled blade from the anvil may be used.

Various changes or modifications may be made in different details of construction, operation and arrangement by those skilled in the art without departing from the spirit and scope of my invention as set forth in the appended claims.

Having fully described my invention, what I claim as new and desire to secure by Letters Patent is:—

1. In apparatus of the class described, a heater having a passage therethrough, means to introduce to the passage one by one the objects to be heated, a support intermittingly moved into and out of the passage, to arrest therein for a predetermined time each object to be heated, and cooling means connected with the heater, to receive and act upon each heated object as it is discharged from the heater upon withdrawal of the support.

2. In tempering apparatus, a heater consisting of a massive metallic block having an elongated, upright passage therethrough, to receive at its upper end one by one the objects to be heated, means to temporarily support the object in the lower part of the passage and to release the object at the end of a predetermined period, and means to raise the temperature of the passage by the action of a heating medium upon the exterior of the heater.

3. In apparatus for tempering blades, a magazine to receive a series of blades placed face to face, a reciprocating transferrer to engage the leading blade of the series and remove it from the magazine, a raceway through which the transferred blade passes by gravity, a metallic heater having an upright passage therethrough communicating with the lower end of the raceway, means to maintain the passage at a high temperature by the action of a heating medium to the exterior of the heater, a blade-arrester to temporarily arrest each blade within the passage as it passes thereto from the raceway, an inclined raceway leading from the bottom of the passage, and a cooling instrumentality comprising an anvil and a coöperating reciprocating hammer, and means to maintain the anvil and hammer cold, the hot blade released from the passage sliding down the inclined raceway onto the face of the anvil, to receive the blow of the hammer.

4. In apparatus for tempering blades, a magazine to receive a series of blades placed face to face, a reciprocating transferrer to engage the leading blade of the series and remove it from the magazine, a raceway through which the transferred blade passes by gravity, a metallic heater having an upright passage therethrough communicating with the lower end of the raceway, means to maintain the passage at a high temperature by the action of a heating medium to the exterior of the heater, a blade-arrester to temporarily arrest each blade within the passage as it passes thereto from the raceway, an inclined raceway leading from the bottom of the passage, and a cooling instrumentality to act upon a hot blade delivered from the raceway, said instrumentality comprising two relatively movable, continuously cooled metallic members to receive between them the hot blade and subject it to pressure and cooling simultaneously.

5. In apparatus for tempering blades, a magazine to receive a series of blades placed face to face, a reciprocating transferrer to engage the leading blade of the series and remove it from the magazine, a raceway through which the transferred blade passes by gravity, a metallic heater having an upright passage therethrough communicating with the lower end of the raceway, means to maintain the passage at a high temperature by the action of a heating medium to the exterior of the heater, a blade-arrester to temporarily arrest each blade within the passage as it passes thereto from the raceway, an inclined raceway leading from the bottom of the passage, and a cooling instrumentality to act upon a hot blade delivered from the raceway, said instrumentality comprising two continuously cooled members one of which is moved intermittingly with a hammer-blow against the other, to subject the hot blade between them to pressure and cooling simultaneously.

6. In apparatus for tempering blades, means to receive and heat the blades singly, a raceway to conduct by gravity the hot blades from said heating means, a continuously cooled metallic anvil upon which the hot blades are delivered from said raceway, a continuously cooled hammer, means to raise it, a latch to maintain it elevated, a spring to move the hammer downward upon the anvil to deliver a quick, sharp blow, and a device to intermittingly act upon and withdraw the latch from coöperation with the hammer.

7. In apparatus for tempering blades, means to receive and heat the blades singly, a raceway to conduct by gravity the hot blades from said heating means, a continuously cooled metallic anvil upon which the hot blades are delivered from said raceway, a continuously cooled hammer, a spring to move it downward with a quick blow upon the anvil, means to lift the hammer and thereafter stretch the spring, a latch to hold the hammer lifted, and a device to retract the latch automatically when the spring has been stretched.

8. In apparatus for tempering blades, means to heat the blades one by one while protecting them from contact with the heating medium, means to subject the hot blades to simultaneous cooling and rapid compression, a device to deliver the hot blades one by one to said cooling and compressing means, and an intermittingly acting air blast to remove the cooled blade from said means.

9. In apparatus for tempering blades, a metallic anvil having a horizontal face, a reciprocating, continuously cooled hammer to deliver a blow upon a hot blade upon the anvil, means to deliver by gravity hot blades one by one to the anvil, and a stop to act upon the blade and position it on the anvil.

10. In apparatus for tempering blades, a metallic anvil having a horizontal face, a reciprocating, continuously cooled hammer to deliver a blow upon a hot blade upon the anvil, an inclined raceway having its mouth at one side of the anvil, the hot blades sliding down the raceway and out of its mouth onto the anvil, and a stop at the opposite side of the latter to stop the movement of a blade as it slides across the anvil and properly position it thereupon.

11. In apparatus for tempering blades, a metallic anvil having a horizontal face, a reciprocating, continuously cooled hammer to deliver a blow upon a hot blade upon the anvil, an inclined raceway having its mouth at one side of the anvil, the hot blades sliding down the raceway and out of its mouth onto the anvil, and a wooden block at the opposite side of the anvil, to stop the movement of the blade and by rebound thereof position it upon the anvil to receive the blow of the hammer.

12. In apparatus for tempering blades, heating means, comprising a covered chamber to contain the heating medium, a metallic block constituting a heater and having a blade-passage through it, said heater being set in the chamber with the upper end of the passage above the closed top thereof, the bottom of said chamber having an opening registering with the lower end of the passage, and a blade-arrester movable into and out of the passage at right angles thereto, the blades passing lengthwise down the passage and being arrested temporarily therein to acquire the requisite temperature, combined with automatic means to deliver blades singly to the upper end of the passage.

13. In apparatus for tempering blades, heating means, comprising a covered chamber to contain the heating medium, a metallic block constituting a heater and having a blade-passage through it, said heater being set in the chamber with the upper end of the passage above the closed top thereof, the bottom of said chamber having an opening registering with the lower end of the passage, and a blade-arrester movable into and out of the passage at right angles thereto, the blades passing lengthwise down the passage and being arrested temporarily therein to acquire the requisite temperature, combined with means to deliver blades one by one to the upper end of the passage, and mechanism to actuate the blade-arrester and retract it at predetermined intervals and immediately return it to arresting position, each heated blade being released by said arrester and the latter returning to arresting position before the next blade is delivered to the passage in the heater.

In testimony whereof, I have signed my name to this specification, in the presence of two subscribing witnesses.

RICHARD T. WINN.

Witnesses:
JOHN C. EDWARDS,
THOMAS J. DRUMMOND.